(12) United States Patent
Pekary et al.

(10) Patent No.: US 7,124,183 B2
(45) Date of Patent: Oct. 17, 2006

(54) METHOD AND APPARATUS FOR SECURE DISTRIBUTED MANAGED NETWORK INFORMATION SERVICES WITH REDUNDANCY

(75) Inventors: Dave Pekary, Manotick (CA); Chris Sibbitt, Ottawa (CA); Michael Kelland, Ottawa (CA); Arthur Vardanyan, Ottawa (CA); Ronald Ross, Kanata (CA)

(73) Assignee: Bell Security Solutions Inc., Toronto (CA)

( * ) Notice: Subject to any disclaimer, the term of this patent is extended or adjusted under 35 U.S.C. 154(b) by 656 days.

(21) Appl. No.: 10/145,793

(22) Filed: May 16, 2002

(65) Prior Publication Data

US 2003/0061346 A1    Mar. 27, 2003

Related U.S. Application Data

(60) Provisional application No. 60/324,529, filed on Sep. 26, 2001.

(51) Int. Cl.
  *G06F 15/16* (2006.01)
(52) U.S. Cl. ............... 709/224; 709/239; 370/231; 370/397
(58) Field of Classification Search ........ 709/200–201, 709/220–227, 238–239, 244; 370/236, 231, 370/235, 397; 713/201
See application file for complete search history.

(56) References Cited

U.S. PATENT DOCUMENTS

| 5,819,028 | A | 10/1998 | Manghirmalani et al. ............ 395/185.1 |
|---|---|---|---|
| 5,854,895 | A | 12/1998 | Nishina et al. ........ 395/200.51 |
| 6,012,100 | A | 1/2000 | Frailong et al. ............ 709/250 |
| 6,085,255 | A * | 7/2000 | Vincent et al. ............. 709/238 |
| 6,108,782 | A | 8/2000 | Fletcher et al. ............. 713/153 |
| 6,148,337 | A | 11/2000 | Estberg et al. ............... 709/224 |
| 6,182,249 | B1 | 1/2001 | Wookey et al. ............... 714/47 |
| 6,212,558 | B1 | 4/2001 | Antur et al. ................ 709/221 |
| 6,226,372 | B1 * | 5/2001 | Beebe et al. ................ 379/189 |
| 6,243,815 | B1 | 6/2001 | Antur et al. ................ 713/201 |
| 6,256,670 | B1 | 7/2001 | Davies ........................ 709/224 |
| 6,279,037 | B1 | 8/2001 | Tams et al. .................. 709/224 |
| 6,418,445 | B1 * | 7/2002 | Moerbeek ............... 707/103 X |
| 6,757,712 | B1 * | 6/2004 | Bastian et al. ............. 709/206 |
| 6,778,498 | B1 * | 8/2004 | McDysan .................... 370/231 |
| 2003/0033401 | A1 * | 2/2003 | Poisson et al. ............. 709/224 |
| 2003/0055933 | A1 * | 3/2003 | Ishizaki et al. ............. 709/223 |

FOREIGN PATENT DOCUMENTS

| EP | 1047224 | 4/2000 |
|---|---|---|
| WO | 9901128 | 12/1999 |

* cited by examiner

*Primary Examiner*—Moustafa M. Meky

(57) ABSTRACT

Provided is a managed network service delivery system and method. The managed network service delivery system includes an IOC (Internetworking Operating Center) and a SCA (SAM (Security Activity Manager) Collector Agent) at at least one of a plurality of customer sites of a customer. The customer sites are connected to the IOC through a VPN (Virtual Private Network) or directly from a respective one of the SCAs to the IOC. The SCAs collect log and statistical information from equipment at a respective one of the customer sites and provide summary information to the IOC. The SCAs also perform queries regarding status of equipment and report to the IOC. The customer accesses reports from a web server at the IOC or through a PSTN (Public Switched Telephone Network) connection at the SCAs. A redundant connection, through the PSTN, between a SCA and the IOC provides a robust system for management, monitoring and security of the customer sites.

47 Claims, 13 Drawing Sheets

METHOD AND APPARATUS FOR SECURE DISTRIBUTED MANAGED NETWORK INFORMATION SERVICES WITH REDUNDANCY

RELATED APPLICATION

This Application claims the benefit of U.S. Provisional Application No. 60/324529 filed Sept. 26, 2001.

FIELD OF THE INVENTION

The invention relates to a method and apparatus for remotely and robustly managing and monitoring networks.

BACKGROUND OF THE INVENTION

Remote management and monitoring of networks is becoming more and more common. Furthermore, providing security services to customers is also important in protecting a customer's network against any type of intrusion. Several applications are available to service providers for providing remote network management services, monitoring services and security services to customers. Typically, a service provider runs a network management center that provides a VPN (Virtual Private Network) to a customer. The VPN provides a plurality of connections between the network management center and a number of customer sites. The connections may be established through, for example, a public Internet. Each customer site has a LAN (Local Area Network) and applications at the network management center manage, monitor and provide security for equipment in the LANs. In monitoring several customer sites, the network management center must query the equipment in the LANs at the customer sites. This results in much information being transferred through the VPN and can result in bottlenecks at the network management center when the network management center provides services for many customers. Furthermore, in some cases a connection to a customer site may be unavailable due to, for example, congestion in the public Internet or due to failure of a firewall, or other equipment, at the customer site. In either case the network management center is no longer able to provide management services, monitoring services or security services. The network management center is not able to determine whether a failed connection to the customer site is due to Internet congestion or due to failure of equipment at the customer site. Furthermore, since there is no connection established to the customer site, in the event that the connection is lost due to equipment failure at the customer site the network management center cannot manage the equipment at the customer site to rectify any problems since there is no connection established.

SUMMARY OF THE INVENTION

Embodiments of the invention provide a managed network service delivery system and method. The managed network service delivery system includes a network management center which is used to provide network services to at least one customer having one or more customer sites. The customers sites are connected to the network management center through a VPN (Virtual Private Network). Connections through the VPN are provided, for example, by a public Internet. The managed network service delivery system also includes a DCE (Data Collection Element) at at least one of the customer sites. In some embodiments of the invention, the DCE is a server or, more particularly, an SCA (SAM (Security Activity Manager) Collector Agent) device. The DCEs collect status information, as well as log and statistical information, from equipment at a respective one of the customer sites and provide summary information to a DPE (Data Processing Element) at the network management center. The DCEs also perform queries regarding status of equipment and provide responses from the queries to the DPE. In some embodiments, a DCE is provided at the network management center to provide DCE functionality to customer sites that do not have a DCE. Customers access reports, provided by the DPE, on the summary information and the responses from a web server at the network management center through the public Internet or access information at the DCEs, through a PSTN (Public Switched Telephone Network). A redundant connection, through the PSTN, between a DCE and the network management center provides a robust system for management, monitoring and security of the customer sites.

In some embodiments additional applications are also provided at the customer sites and the network management center to provide additional management and security services.

In accordance with a first broad aspect of the invention, provided is a network management system. The network management system has a network management center adapted to manage a VPN which provides connections between customer sites of a customer the network management center. The network management system also has a DCE in at least one of the customer sites. The DCEs collect information on equipment at the customer site. Each DCE also provide at least some of its information collected to the network management center on an ongoing basis through the VPN. Furthermore, each DCE also accesses an alternative channel through which to deliver the information to the network management center in the event that data cannot be delivered from a respective DCE to the network management center through the VPN.

In some embodiments, the DCEs may be used to perform filtering of the information on the equipment at a customer site and to then deliver filtered information to the network management center as summary information. Furthermore, the DCEs may have security applications that may be used to monitor equipment at a respective one of the customer sites and may provide status information on the equipment at a respective DCE.

In some embodiments, reports at the network management center are accessed by customers through a remote access channel.

In some embodiments, the network management center has a DPE and a database in which data associated with reports on status information associated with information sent from the DCEs are stored by the DPE on an ongoing basis. The DPE receives the status information, performs reporting of the status information and stores data associated with the reports in the database. Furthermore, in some embodiments the DPE performs any necessary alerting actions based on the status information. In some embodiments, the DPE also has a timer function that enables a timer to be set for a service associated with customer equipment. The timer is reset each time a response of any type is received from the service. However, if the timer reaches a timeout value without any response, the timer function generates an alert.

In some embodiments, the alternative channel is a dial-up port through which the DCE can initiate a separate connection to the network management center through a PSTN.

Furthermore, in some embodiments the DCE activates the alternative channel in the event that data cannot be delivered from the DCE to the network management center through the VPN.

In some embodiments, each DCE has a local database that is dynamically updated with basic local information. The basic local information in the local database is made available through a stripped down browser based interface that is capable of returning only a limited amount of information. Furthermore, in some embodiments the basic local information is distributed to the local databases of each of the customer's other DCEs such that there is a distributed representation of at least the basic local information about the network. Upon detection that the network management center or a link to the network management center is not functioning, the local databases are updated with the basic local information. In addition, in some embodiments, in the event that data cannot be delivered from the DCE to the network management center through either of the VPN and the alternative channel, the DCE will keep data until a connection is established with the network management center at which time the data is sent to the network management center.

In some embodiments, the network management server establishes the alternative channel in the event that data cannot be delivered from the DCE to the network management center through the VPN. Furthermore, the network management center may have a network management server adapted to manage a plurality of network security devices at any of the customer sites.

According to another broad aspect, provided is a method of providing remote network management. The method includes establishing a connection between a network management center and customer sites of a customer through a VPN. Information on equipment is collected at the customer sites and some of the information is sent to the network management center on an ongoing basis through the VPN. In the event that data cannot be delivered from a respective customer site to the network management center through the VPN an alternative channel through which to deliver the information to the network management center is established.

According to another broad aspect, provided is an apparatus for reliable data collection. The apparatus has a DCE that is used to receive information on equipment at a customer site. The DCE filters some of the information and outputs the filtered information through a VPN connection and in the event that the VPN connection is unavailable, the DCE outputs the filtered information through an alternative connection. The DCE has a local database used to store the filtered information as basic local information.

The DCE may establish the alternative connection in the event that the VPN connection is unavailable. Furthermore, the DCE may further filter the filtered information to provide summary information. In some embodiments, the summary information is stored as basic local information in the local database in the event that the summary information cannot be output through the VPN connection and the alternative connection. The DCE distributes the basic local information to other DCEs and receives other basic local information from the other DCEs for redundancy purposes. In some embodiments, the DCE has security applications that are used to query network devices and report to a network management center, through the VPN connection and the alternative connection, based on responses to queries.

According to another broad aspect, provided is a network management center. The network management center has a database. It also has a DPE that is used to receive status information, process the status information to produce reports, and store data associated with the reports in the database. Finally, the DPE has a network management server adapted to establish connections, through a VPN, to customer sites, to monitor the connections and to establish an alternative connection each time one of the connections through the VPN is unavailable.

The data associated with the reports in the database may be made accessible to a web server for reports. Furthermore, in some embodiments the network management server manages and configures remote network devices at the customer sites.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
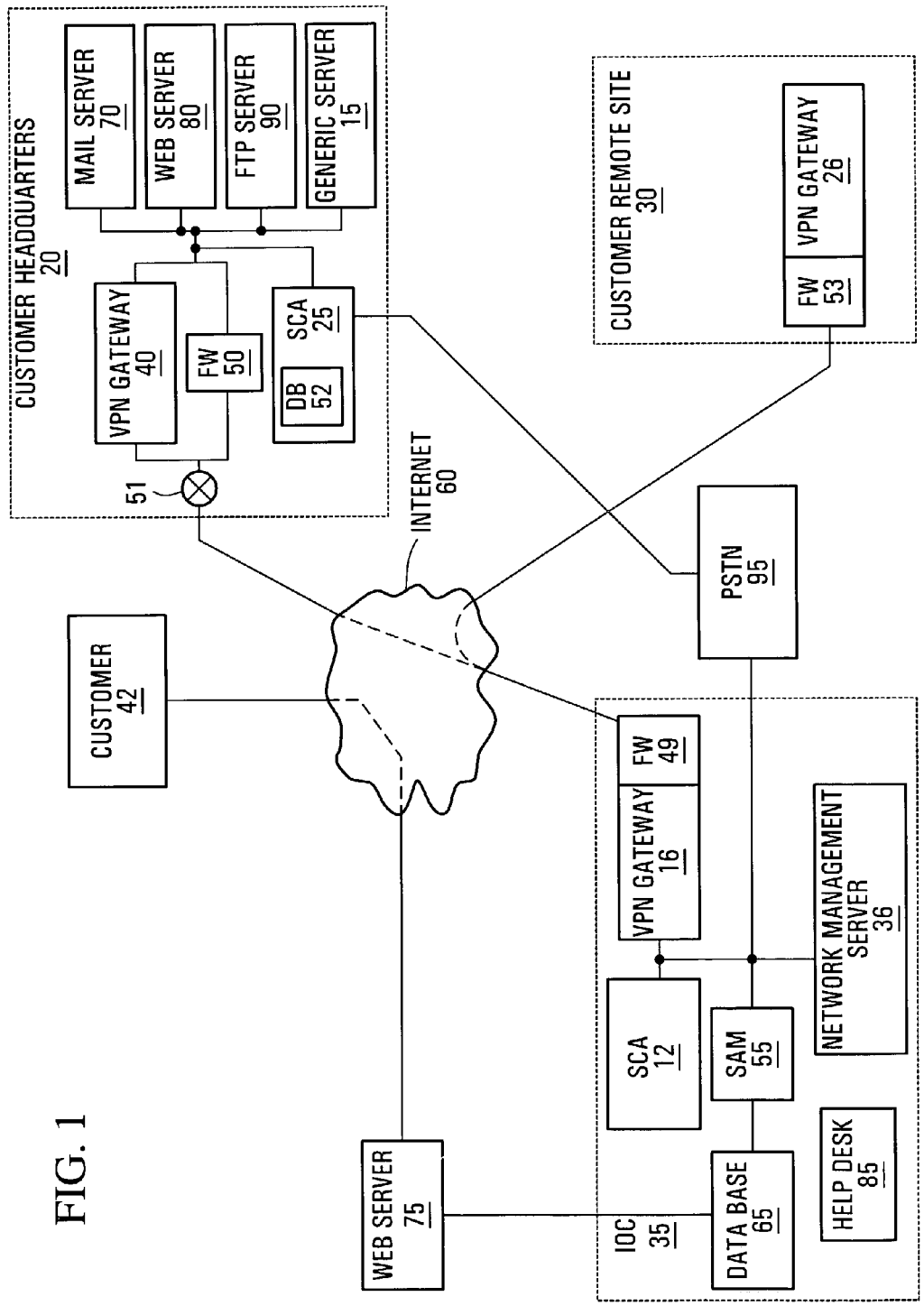
FIG. 1 is a system block diagram of an example deployment of a managed network service delivery system, provided by an embodiment of the invention.

Referring to FIG. 1, shown is a system block diagram of an example deployment of a managed network service delivery system, in an embodiment of the invention. The managed network service delivery system shows an example deployment for one customer. The managed network service delivery system includes an IOC (Internetworking Operating Center) 35 and a SCA (SAM (Security Activity Manager) Collector Agent) 25 at a customer headquarters 20. The IOC 35 is connected to a public Internet 60 through a firewall (FW) 49 and a VPN (virtual private network) gateway 16. The IOC 35 may be an otherwise conventional network management center modified to function according to one or more embodiments of the invention, or may be completely new. A customer has two customer sites corresponding to the customer headquarters 20 and a customer remote site 30 in this example, and the managed network service delivery system manages a VPN that interconnects the IOC 35, the customer headquarters 20 and the customer remote site 30. In other embodiments of the invention, the managed network service delivery system manages VPN interconnecting several customers each having one or more sites. The customer headquarters 20 has a firewall 50 and a VPN gateway 40 connected to a public Internet 60 through a router 51. In other embodiments, the public Internet 60 may be replaced with any non-secure network through which secure channels can be established. Details of the customer headquarters 20 show the firewall 50 and the VPN gateway 40 which is a VPN gateway for a LAN (Local Area Network) to which various customer headquarters equipment are connected. In the illustrated example, the customer headquarters equipment includes a mail server 70, a web server 80, a FTP (File Transfer Protocol) server 90 and other generic servers 15, but in other embodiments of the invention other equipment may alternatively be present. The details of the customer remote site 30 are not shown. In the preferred embodiment of FIG. 1, only the customer headquarters 20 has a customer-side SCA 25 connected to the VPN gateway 40 and the firewall 50. The customer-side SCA 25 is any suitable DCE (Data Collection Element) typically a server, capable of collecting data and processing the data among other functionalities. The customer-side SCA 25 has a local database (DB) 52. According to a preferred embodiment, each one of the customer sites also has an SCA that forms part of the managed network service delivery system. This will be elaborated upon in detail below. In the preferred embodiment of FIG. 1, the customer remote site 30 is connected to the IOC-side SCA 25 through a VPN gateway 26, a firewall 53, the public Internet 60, the firewall 49 and the VPN gateway 16. Alternatively, in other embodiments of the invention the customer remote site 30 is connected to the customer-side SCA 25 through the VPN gateway 26, the firewall 53, the public Internet 60, the router 51 and the VPN gateway 40.

The IOC 35 is the location/equipment responsible for remote management of the customer's VPN gateways 40, 26 and the firewalls 50, 53. In some cases, the IOC 35 may also be responsible for remote management of any other customer equipment, such as the servers 15, 70, 80, 90, a customer might have. In one embodiment of the invention there is a single IOC which is operated by a managed network services providing company to provide managed network services to a plurality of customers. In other embodiments of the invention there are more than one IOC providing managed network services to a plurality of customers. The IOC 35 includes a control center (not shown), a 7×24 (7 days a week, 24 hrs a day) help desk 85 and technical support. The IOC 35 is also connected to the VPN gateway 40 and the firewall 50 through the public Internet 60. The IOC 35 has an IOC-side SCA 12 that is any suitable DCE capable of collecting data and processing the data among other functionalities. The IOC 35 also has a SAM-Event function, a SAM alert function, a SAM logging function and a report function, hereafter collectively referred to as SAM 55, and has a database 65. The SAM 55 is any suitable DPE (Data Processing Element) capable of operating on input data and producing output data. The IOC 35 also has a network management server 36. A web server 75 may be co-located with the IOC 35 and has access to the database 65. In other embodiments of the invention there are two or more web servers which may or may not be co-located with the IOC 35. A customer 42 can access the web server 75 through a remote access channel using the public Internet 60. A PSTN (Public Switched Telephone Network) 95 provides a redundant connection between the SAM 55 at the IOC 35 and the customer-side SCA 25 at the customer headquarters 20. Embodiments of the invention are not limited to having the SAM 55, the database 65 and the network management server 36 as separate elements. In other embodiments of the invention, any two or more of the SAM 55, the database 65 and the networks management server 36 can be combined into a single element. For example, in cases where the IOC 35 provides services for few customers and there is not much traffic through the SAM 55, the SAM 55, the database 65 and the network management server 36 may form part of a single element. However, in cases where the IOC 35 provides services for many customers and there is a lot of traffic through the SAM 55, the SAM 55 and the database 65 may form part of a single element and the network management server 36, from which customer equipment such as the VPN gateways 26, 40, the firewalls 50, 53 and the servers 15, 70, 80, 90 are managed, is kept separate. The SCA 12, the VPN gateway 16 and the web server 75 are kept as separate elements for security purposes.

In the preferred embodiment of FIG. 1, a secure channel through the VPN gateway 40, the router 51, the public Internet 60, the firewall 49 and the VPN gateway 16, between the customer-side SCA 25 at the customer headquarters 20 and the SAM 55 at the IOC 35 is established by the network management server 36. The channel is established through, for example, a secure tunnel using PPP (Point-to-Point Protocol). Such a secure tunnel provides a robust connection that is not port specific and provides an added level of security by limiting the number of connections through the VPN gateway 40 to a single channel.

The customer-side SCA 25 is configured to monitor the equipment at the customer headquarters 20. The customer-side SCA 25 collects log information and statistical information generated by the customer equipment. The information includes, for example, syslog messages, or other data such as SNMP (Simple Network Management Protocol). The customer-side SCA 25 also collects data associated with the firewalls 50, 53, such as SNMP, to provide managed security services. The log information and the statistical information is then, in some embodiments, filtered and then pushed up to the SAM 55 through the VPN gateway 40 as summary information as detailed below. The customer-side SCA 25 also performs ICMP echo, SNMP and FTP queries to monitor the equipment within the customer headquarters 20 as appropriate. Responses from the queries are sent to the SAM 55 through the VPN gateway 40. In some case the responses are first processed to obtain the necessary information. For example, calculations may have to be performed before any relevant information can be extracted.

The SAM 55 is, in some embodiments, a thin client with very high scalability. The SAM 55 performs reporting (presentation of status information) and alerting (performing any necessary alerting actions) functionality. The SAM 55 receives the summary information and the responses from each of the IOC-side SCA 12 and the customer-side SCA 25. Together the summary information and the responses provide status information for customer equipment. The web server 75 retrieves data on the summary information and the responses from the database 65, creates reports and makes the reports available to customers. The customer 42 can access the reports by a secure (e.g. SSL (Secure Socket Layer)) connection through the public Internet 60 from any place at any time. In other embodiments, a customer can access the reports by dialup through the PSTN 95.

The summary information and the responses are in a format that is recognizable as a SAM-Event by the SAM logging function of the SAM 55. The summary information and the responses are in the form of messages and these messages tell the SAM 55 exactly what to display. For example, in one embodiment of the invention, a message from the summary information and the responses includes the following message: SERVICE:HOST:COLOR:MESSAGE. The term "SERVICE" identifies any service such as, for example, PING or FTP. The term "HOST" is the hostname of a particular piece of equipment being monitored. The term "COLOR" indicates the status of the piece of equipment being monitored and the term "MESSAGE" corresponds to any additional information provided. In an example, the mail server 70 has a hostname mail.customer.com. In the event that the mail server 70 goes down and cannot be reached the following message is sent to the IOC 35, by the customer-side SCA 25, as part of a response: ping:mail.customer.com:red. In this case, the message indicates to the SAM 55 that, using ping, the status of the device corresponding to the hostname "mail.customer.com"(the mail server 70) corresponds to red where red indicates, in this case, that the device is not reachable. Other colors are also used. For example, with ping, "green" may indicate that the device is reachable and "yellow" may indicate that the device is reachable but with a high latency. The terms "ping", "mail.customer.com" and "red" provide all the information required by the SAM 55 to display the status of the mail server 70.

The term MESSAGE may be used to send "one-time" status information to be acknowledged by the IOC 35. For example the message could say "Device Rebooted" or "Vulnerability Scan started".

In the example, there are three states for ping for which messages are sent as responses to the IOC 35. However, the SAM-Event function handles a fourth state in which COLOR=blue is generated by a SAM-Event. The SAM-Event function has the ability to set configurable timeouts for receiving messages for any service. For example, if the SAM 55 has not received a message from the customer-side SCA 25 regarding the status of the PING service of the mail server 70, the SAM-Event function of the SAM 55 changes the state of the PING service to blue indicating that information on ping is not being returned from the customer-side SCA 25 to the IOC 35.

Figure 2:
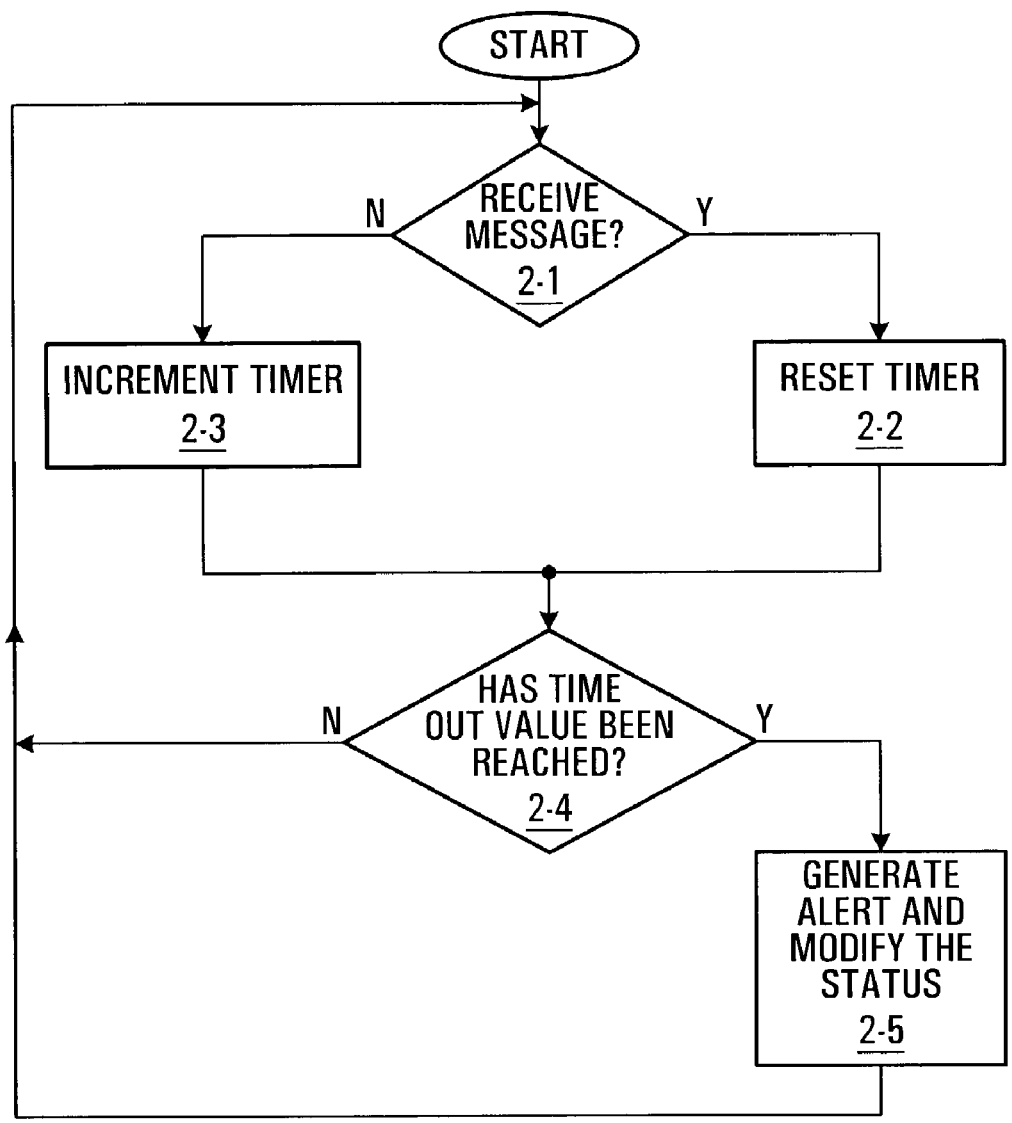
FIG. 2 is a flow chart of a method used to implement a timer function associated with a SAM-Event (Security Activity Manager-Event) for monitoring a customer-side SCA of FIG. 1.

In an illustrative example, the SAM-Event function of the SAM 55 has a timer function that enables a timer to be set for messages sent by the customer-side SCA 25. Referring to FIG. 2, shown is a flow chart of a method used to implement the timer function associated with a SAM-Event for monitoring the customer-side SCA 25. Each time a message of any type is received from the customer-side SCA 25 (step 2-1) a timer is reset (step 2-2) otherwise the timer is incremented (step 2-3). The timer has an associated timeout value. At step 2-4, if the timer reaches the timeout value before a message is received, then an alert is generated and the status associated with the SAMEvent is modified (step 2-5). For example, in the case when the customer-side SCA 25 is expected to send a particular message as a response every minute, a timeout value of 1.5 minutes may be used. The alert is generated in any suitable form, for example page or e-mail. The SAM 55 generates these alerts.

Figure 3:
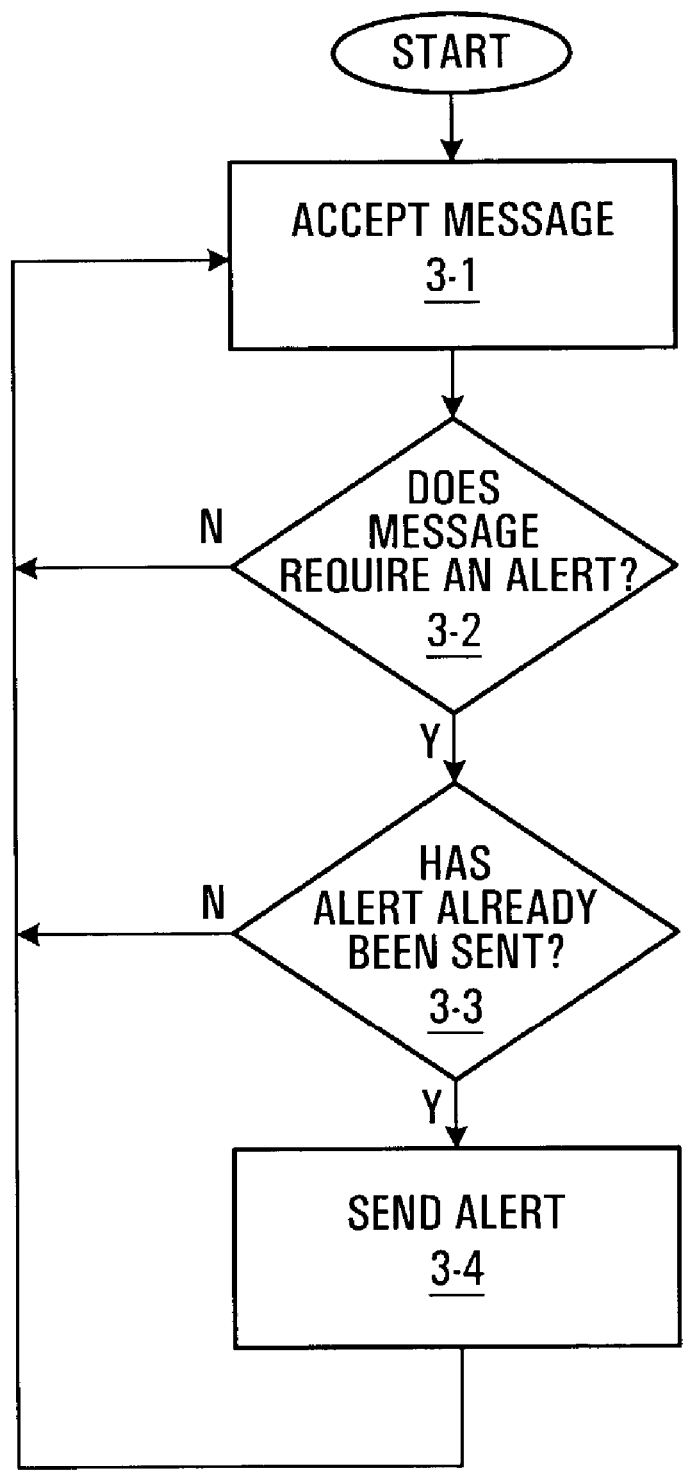
FIG. 3 is a flow chart of a method used by a SAM alert function of the SAM of FIG. 1 to produce alerts.

Referring to FIG. 3, shown is a flow chart of a method used by the SAM alert function of the SAM 55 of FIG. 1 to produce alerts. The SAM alert function runs as a daemon. The daemon accepts messages from the summary information and the responses sent from the customer-side SCA 25 and the IOC-side SCA 12 (step 3-1). The daemon verifies if a message requires an alert (step 3-2). At step 3-3, if the message requires an alert the daemon verifies if the alert has already been sent (step 3-3) otherwise the daemon accepts a next message (step 3-1). At step 3-3, if an alert associated with the message has already been sent, the daemon accepts a next message (step 3-1) otherwise an alert is sent (step 3-4), for example, in the form of a page, e-mail or audible alarm.

Referring back to FIG. 1, the IOC-side SCA 12 performs SCA functionality for the customer remote site 30 that is not equipped with an SCA. However, as discussed above, in another embodiment of the invention, the customer remote site is connected to the customer-side SCA 25 through a VPN connection through the public Internet 60. In such an embodiment, the customer-side SCA 25 performs SCA functionality for customer equipment at the customer remote site 30 and there is no requirement for the IOC-side SCA 12. Furthermore, in other embodiments of the invention, customers are equipped with a SCA at each site and there is no requirement for the IOC-side SCA 12.

In the IOC-side SCA 12 deployment scenario of FIG. 1, IOC personnel visit to the customer site and perform a network audit to obtain IP addresses and other information in respect of the equipment which is to be monitored. A secure channel through the VPN gateways 16, 26 and the public Internet 60 between the IOC-side SCA 12 and the equipment at the customer remote site 30 is established. More particularly, for example, an SSH (secure shell) is used to establish the secure channel. The IOC-side SCA 12 performs a filtering operation on statistical information collected from the remote customer site 30 and then stores it in the database 65. The IOC-side SCA 12 also performs ping, SNMP and FTP queries to monitor equipment at the customer remote site 30. Responses from the ping, SNMP and FTP queries are sent to the SAM 55.

Figure 4:
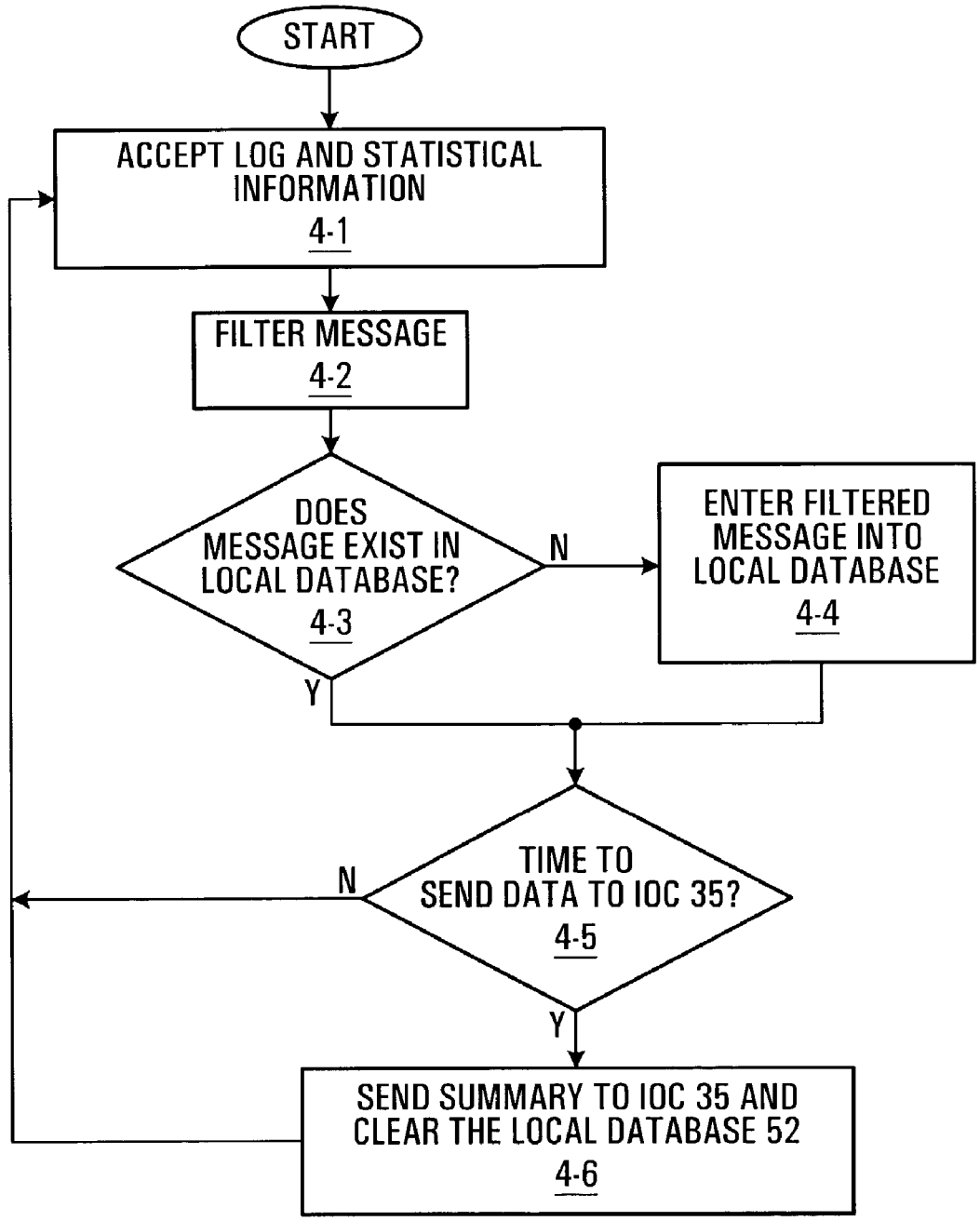
FIG. 4 is a flow chart of a method used by the customer-side SCA of FIG. 1 to filter information on a customer's LAN (Local Area Network)

Referring to FIG. 4, shown is a flow chart of a method used by the customer-side SCA 25 of FIG. 1 to filter the log information and the statistical information on the customer's LAN. The customer-side SCA 25 accepts log information and statistical information generated by the firewall 50 and other customer equipment within the customer headquarters 20 (step 4-1). Examples of collected log information and statistical information include, for example, user sessions, web traffic and service traffic. The customer-side SCA 25 performs a local filtering operation (step 4-2) before sending any information over the network to the IOC 35. This considerably reduces network traffic and bandwidth consumption since a majority of information collected by the customer-side SCA 25 may not be of any interest to the IOC 35. Filtered messages intended for the IOC 35 are verified against other messages in a respective one of the local database 52 at the customer-side SCA 25 (step 4-3). Messages that are not found in the local database 52 at the customer-side SCA 25 are entered into the local database 52

(step 4-4). At step 4-4, as described above, the messages being stored in the local database 52 are stored as summary information in a format that is recognizable as a SAM-Event by the SAM 55. At step 4-5, if the time elapsed since information was last sent to the IOC 35 has exceeded a limit, for example sixty minutes, then the information in the local database 52 of the customer-side SCA 25 is sent to the IOC 35 and the local database 52 is cleared (step 4-6) otherwise the customer-side SCA 25 accepts once again log information and statistical information (step 4-1). At step 4-6 a further filtering process is performed wherein only the most important messages are sent as part of the summary information. For example, in providing information on web traffic, (or equivalently, user sessions or service traffic) only information corresponding to the top 10 web sites visited by users within the customer headquarters 20 will form part of the summary information sent to the IOC 35. A method by which the information is sent from the customer-side SCA 25 to the IOC 35 will be described below with reference to FIG. 5.

The filtering processes of steps 4-2 and 4-6, and the format in which messages from the summary information are sent to the IOC 35 result in low bandwidth requirements. More particularly, the network traffic and bandwidth consumption is reduced by up to approximately 3 orders of magnitude. Furthermore, in one embodiment of the invention, the summary information is sent to the IOC 35 at time intervals of approximately sixty minutes. The low bandwidth requirements and the periodic transfer of the summary information provide scalability at the IOC 35 for managing multiple customer sites for multiple customers. Embodiments of the invention are not limited to having SCAs send summary information every sixty minutes. Increasing the time interval at which the summary information is sent to the IOC 35 results in a decrease in network traffic and bandwidth consumption and therefore provides scalability at the IOC 35.

Figure 5:
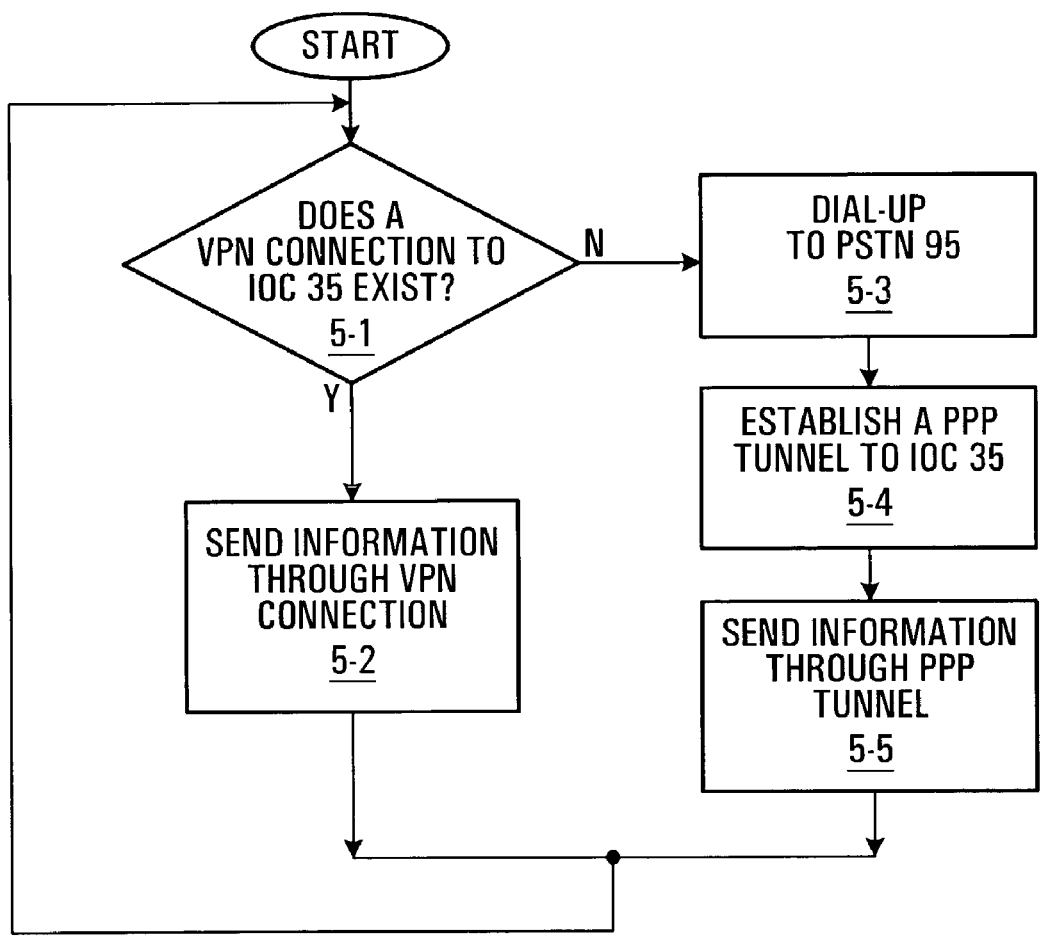
FIG. 5 is a flow chart of a method of sending summary information from the customer-side SCA to an IOC (Internetworking Operating Center) of FIG. 1.

Referring to FIG. 5, shown is a flow chart of a method of sending the summary information from the customer-side SCA 25 to the IOC 35 of FIG. 1. At step 5-1, if a VPN connection between the customer-side SCA 25 and the IOC 35 exists (step 5-1), then the summary information is sent through the VPN connection (step 5-2). However, if a VPN connection between the customer-side SCA 25 and the IOC 35 does not exist (step 5-1) then a dial up to the PSTN 95 is performed (step 5-3) to establish an encrypted PPP tunnel to the IOC 35 (step 5-4). The summary information is then sent through the encrypted PPP tunnel to the IOC 35 (step 5-5).

In some embodiments the customer-side SCA 25 has other security features. For example, in one embodiment, the customer-side SCA 25 includes additional applications, such as a vulnerability scan tool, a privacy monitoring application, a virus control application and a password auditing tool running at the customer-side SCA 25. The vulnerability scan tool has a scanner, a parser and a report. The scanner is an application residing on the customer-side SCA 25 which scans the LAN at the customer headquarters 20 and identifies security flaws in the LAN. The parser also resides at the customer-side SCA 25. The parser parses output from the scanner and then sends any real-time alerts to the SAM 55 in the form of messages. The alerts may be generated in any suitable form, for example, page or e-mail. The SAM 55 generates these alerts, and also generates reports that are entered into the database 65 and made available to customers through the web server 75. In the case of the privacy monitoring, any violations of the Privacy Act are detected at the customer-side SCA 25 and alerts (messages) are sent to the SAM 55. The SAM 55 then triggers on an alert message. With the virus control application, the customer-side SCA 25 collects any network virus related activities and forwards related information to the SAM 55 for alerts. For password auditing applications, a password auditing tool running on the customer-side SCA 25 performs password audits on a variety of password files such as, for example, NT SAM files and Unix password files residing at customer equipment. The password auditing tool allows an administrator to upload appropriate password files to the customer-side SCA 25 and run a password audit or schedule to run the password audit. Results from the audit are stored at the customer-side SCA 25 as a report and the report is made available to the administrator through a SCA web interface.

The customer-side SCA 25 and the IOC-side SCA 12 are designed in such a manner to be as secure as possible at the customer site. For example, in one embodiment of the invention the customer-side SCA 25 and the IOC-side SCA 12 are network computer devices such as servers and, in some embodiments, all unnecessary functions are completely disabled. For example, in some embodiments, there are no external access devices such as disk drives which may be used to introduce corrupting functionality to the customer-side SCA 25 and the IOC-side SCA 12. In some embodiments, the only functionality made available are queries, the collection of the log information, the statistical information and the responses to the queries, and the secure delivery of this information to the IOC 35. Incumbent on delivery methods are people, processes and agreements which exist to support network managed security. In some embodiments, no agents or third party tools are to be deployed on the customer-side SCA 25 but, as discussed above, embodiments are not limited to cases where there are no third party tools deployed on the customer-side SCA 25. In addition, in some embodiments, the customer-side SCA 25 is a restricted access server placed in a secure room with limited access, and as indicated above, equipped with no extra external interfaces.

In some embodiments of the invention, the customer-side SCA 25 also monitors the connection between the customer headquarters 20 and the IOC 35 and initializes the secure tunnel using PPP. Furthermore, the customer-side SCA 25 also has a dial-up port through which it can initiate a separate connection to the IOC 35 through the PSTN 95. This provides a redundant path through which summary information and responses from queries collected by the customer-side SCA 25 can be delivered to the IOC 35, in the event the VPN gateway 40 goes down, or some part of the connection between the customer-side SCA 25 and the IOC 35 fails or otherwise becomes unavailable. Furthermore, a script running on the network management server 36 routinely monitors the customer-side SCA 25, using ping for example, to determine whether the connection between the IOC 35 and the SCA 25, through the VPN gateways 16 and 40 and the public Internet 60, is established. In the event that a device, such as the VPN gateway 40 or the firewall 50, which connects the customer-side SCA 25 to the IOC 35 fails the network management server 36 detects the failure and establishes a connection between the network management server 36 and the failed device through the PSTN 95 and the customer-side SCA 25. For example, in the event that the firewall 50 fails the script running on the network management server 36 will detect the failure and the script creates a connection through the PSTN 95 and through an encrypted interface of the customer-side SCA 25 to the IP address of the firewall 50. With a connection to the firewall 50 being established, through the SCA 25, management of the firewall 50 can then continue using a management GUI (Graphical User Interface) of the firewall 50 and problems with the firewall 50 may be rectified.

Advantageously, the deployment of the customer-side SCA 25 at the customer headquarters 20 increases overall redundancy of the managed network delivery service system because in the case of Internet congestion, an alternative channel for pushing data back to the IOC 35 can be used through the PSTN 95 connection. Another advantage of having the customer-side SCA 25 at the customer headquarters 20 is true diagnostics of hardware failure at a respective one of the customer headquarters 20. SCA deployment at the IOC 35 site may not provide the actual picture because devices behind the firewall 50 may in fact be functioning properly, but the firewall 50 may not be functioning (as described in the example above) and the IOC-side SCA 12 may not be able to distinguish between a firewall failure and Internet congestion.

Figure 6:
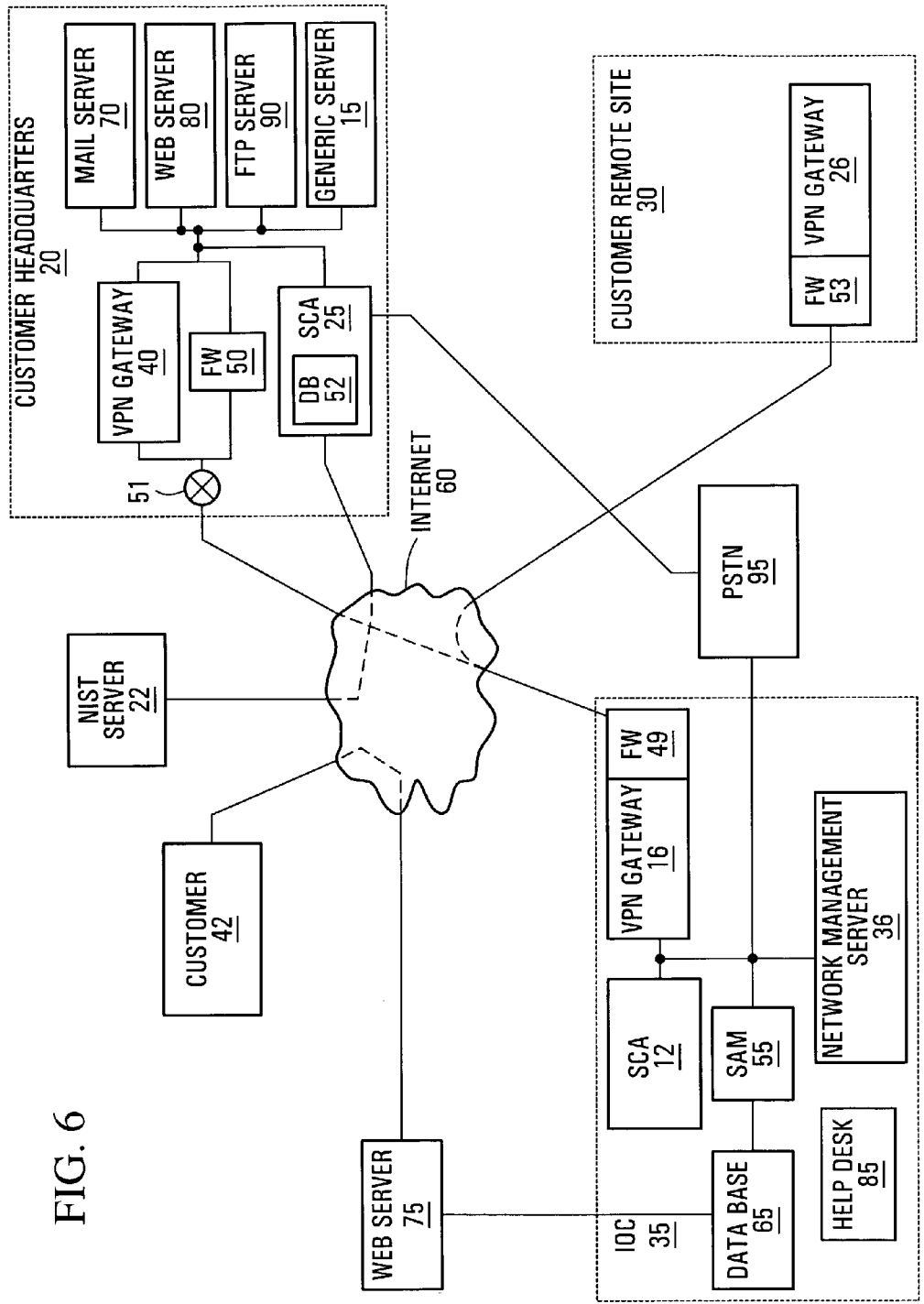
FIG. 6 is a system block diagram of an example deployment of the managed network service delivery system, provided by another embodiment of the invention.

Referring to FIG. 6, shown is a system block diagram of an example deployment of the managed network service delivery system, provided by another embodiment of the invention. In the preferred embodiment of FIG. 6, the customer-side SCA 25 establishes a connection with a NIST (National Institute of Standards and Technology) server 22 and uses NTP (Network Time Protocol) in conjunction with the NIST server 22 to provide an accurate and consistent understanding of time. This allows the IOC 35 to treat alarms/conditions received from the customer-side SCA 25 with the appropriate degree of urgency by being able to detect real-time alerting delays for example. The customer-side SCA 25 might for example query the NIST server 22 at a configurable time period. In this manner, an exact time can be reported in association with each event at the customer site.

Figure 7:
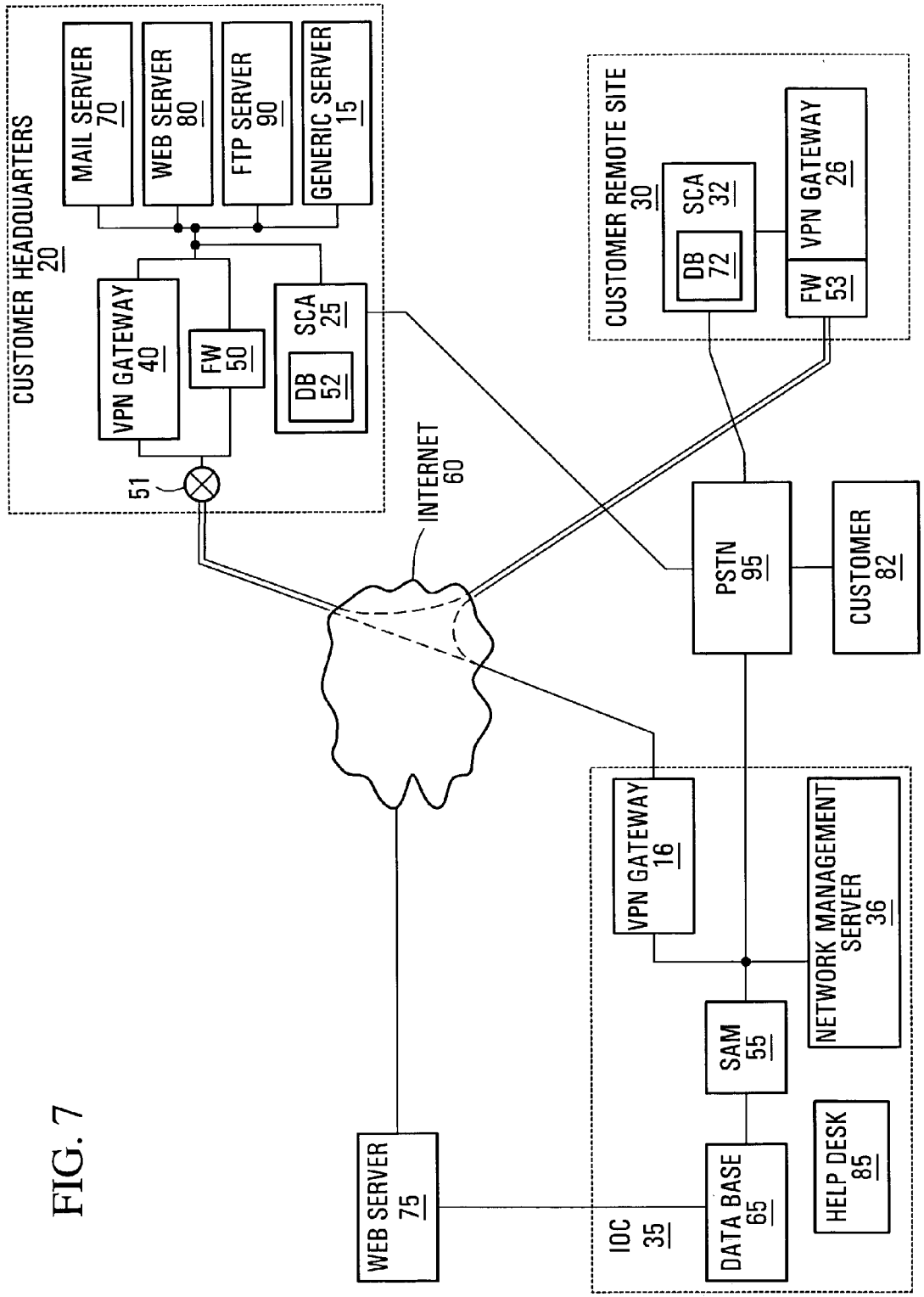
FIG. 7 is a system block diagram of an example deployment of the managed network service delivery system, provided by another embodiment of the invention.

Referring to FIG. 7, shown is a system block diagram of an example deployment of the managed network service delivery system, provided by another embodiment of the invention. In the preferred embodiment of FIG. 7, the customer remote site 30 has a customer-side SCA 32 and the IOC 35 does not have an SCA. The customer-side SCA 32 is any suitable server capable of collecting data and processing the data among other functionalities, and more particularly, the customer-side SCA 32 is a DCE. The customer-side SCA 32 has a local database 72. The network management server 36 establishes a secure channel through the VPN gateways 16 and 26 and the public Internet 60 between the customer-side SCA 32 at the customer remote site 30 and the SAM 55 at the IOC 35. The channel is established through, for example, another secure tunnel using PPP. A customer 82 may establish a connection to any one of the customer-side SCAs 25, 32 through a remote access channel using the PSTN 95 from any point at any time. Furthermore, a connection between the SCAs 25, 32 is established by a secure tunnel using PPP. When compared to FIG. 1, connections within the VPN network show different topologies. More particularly, embodiments of the invention, connections between a customer's headquarters and remote sites form a star topology or mesh topology. Star and mesh topologies are discussed below with reference to FIGS. 12A and 12B.

Each one of the customer-side SCAs 25, 32 collects essential basic local information from equipment within a respective one of the customer headquarters 20 and the customer remote site 30. The basic local information includes, for example, the summary information and the responses from the SMTP, HTTP, ping, SNMP and FTP queries. Each one of the local databases 52, 72 on the customer-side SCAs 25, 32, respectively, is dynamically updated with the essential basic local information. In some embodiments, the basic local information is made available through a stripped down browser based interface which is capable of returning only a limited amount of information. When connectivity with the SAM 55 is lost, the local databases 52, 72 will be the only sources of information on the customer side equipment. In some embodiments, the basic local information is distributed to the local databases 52, 72 of each of the customer's other customer-side SCAs 25, 32 such that there is a distributed representation of at least the basic information about the network. More particularly, basic local information in the local database 52 is copied to the local database 72 and basic local information in the local database 72 is copied to the local database 52. The basic local information may be propagated, for example, with flat files sent through a secure tunnel, established through the PSTN 95, to each one of the customer-side SCAs 25, 32. The basic local information might be distributed between the customer-side SCAs 25, 32 once a day, for example.

In some embodiments, the local databases 52, 72 are set up such that only individuals internal to the customer network can access the basic local information. In the event the web server 75 is not functioning, then the basic local information will still be accessible. In such a case, a closest dialup customer, for example customer 82, establishes a connection through the PSTN 95 and retrieves the basic local information from the local database 72 of the customer-side SCA 32. In some embodiments, the customer-side SCAs 25, 32 will keep the basic local information until a connection through the VPN is re-established with the IOC 35 at which time the basic local information is sent to the SAM 55 and then to the database 65.

In some embodiments, local storage of the basic local information in the databases 52, 72 is only done upon detection that the IOC 35 or a connection through at least one the VPN gateways 16, 40 to the IOC 35 is not functioning. At that point, each one of the customer-side SCAs 25, 32 starts collecting the basic local information until the connection is re-established. Once the connection with the IOC 35 is re-established, the collected basic local information can be deleted.

Figure 8:
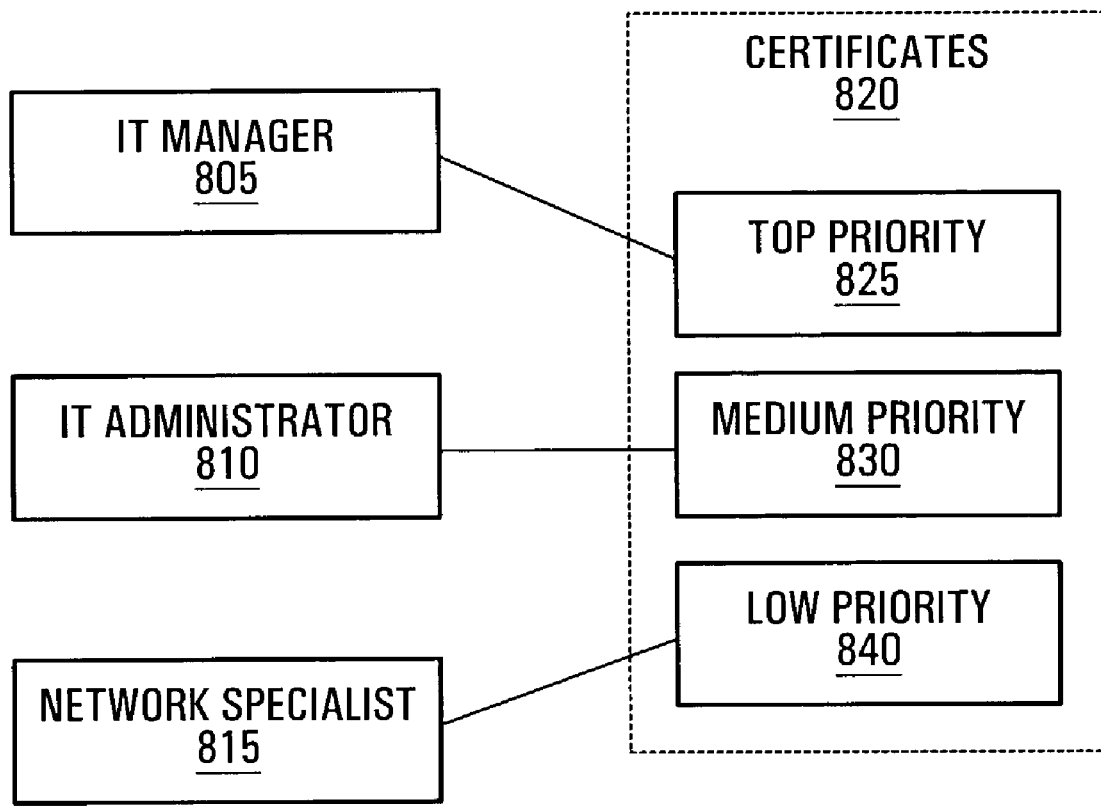
FIG. 8 is a block diagram of certificates, assigned to IT (Information Technology) personnel, for access to SCAs of FIG. 7.

In the preferred embodiment of FIG. 7, the local databases 52, 72 each have the capability to distribute certificates for authorized people to access local data. In some embodiments, access through these certificates is implemented in a prioritized manner that can be re-prioritized. The certificate management is done remotely at the network management server 36 of the IOC 35. In the event of a failure, a tiered access to the local databases 52, 72 is provided. This is done to avoid congestion of network traffic at the customer-side SCAs 25, 32. In the tiered access, the fastest access would be granted to the person with the highest privileges, for example an IT manager in this particular case. This is illustrated diagrammatically in FIG. 8 which illustrates that certificates 820 allow to assign low priority 840 to network specialists 815, top priority 825 for IT managers 805, and medium priority 830 for IT administrators 810. These could be re-prioritized.

In some embodiments, distribution of certificates is operated in conjunction with a business process which provides for a single point of contact (a single person) from a customer site for troubleshooting, certificate enrollment and revocation etc. Embodiments of the invention are not limited to a single point of contact. In some embodiments, the number of points of contact depends on particulars of the customer site and the number of remote sites. For example, in some embodiments, a point of contact is responsible for certificates and a main point of contact is responsible for other issues. However, it is preferable to minimize the number of points of contact.

In another embodiment, SCAs are also used to provide some enhanced service provisions, such as diagnostic tools and reporting capabilities, locally within the customer LAN.

In some embodiments, even for customer-side SCA implementations, the SCA is administered, configured and maintained remotely at an IOC. For example, in FIG. 7 the customer-side SCAs 25, 32, the firewalls 50, 53 and the VPN gateways 40, 26 are administered, configured and maintained remotely by the network management server 36 at the IOC 35. In some cases customer equipment such as the servers 15, 70, 80, 90 are also administered, configured and maintained remotely by the network management server 36.

Figure 9:
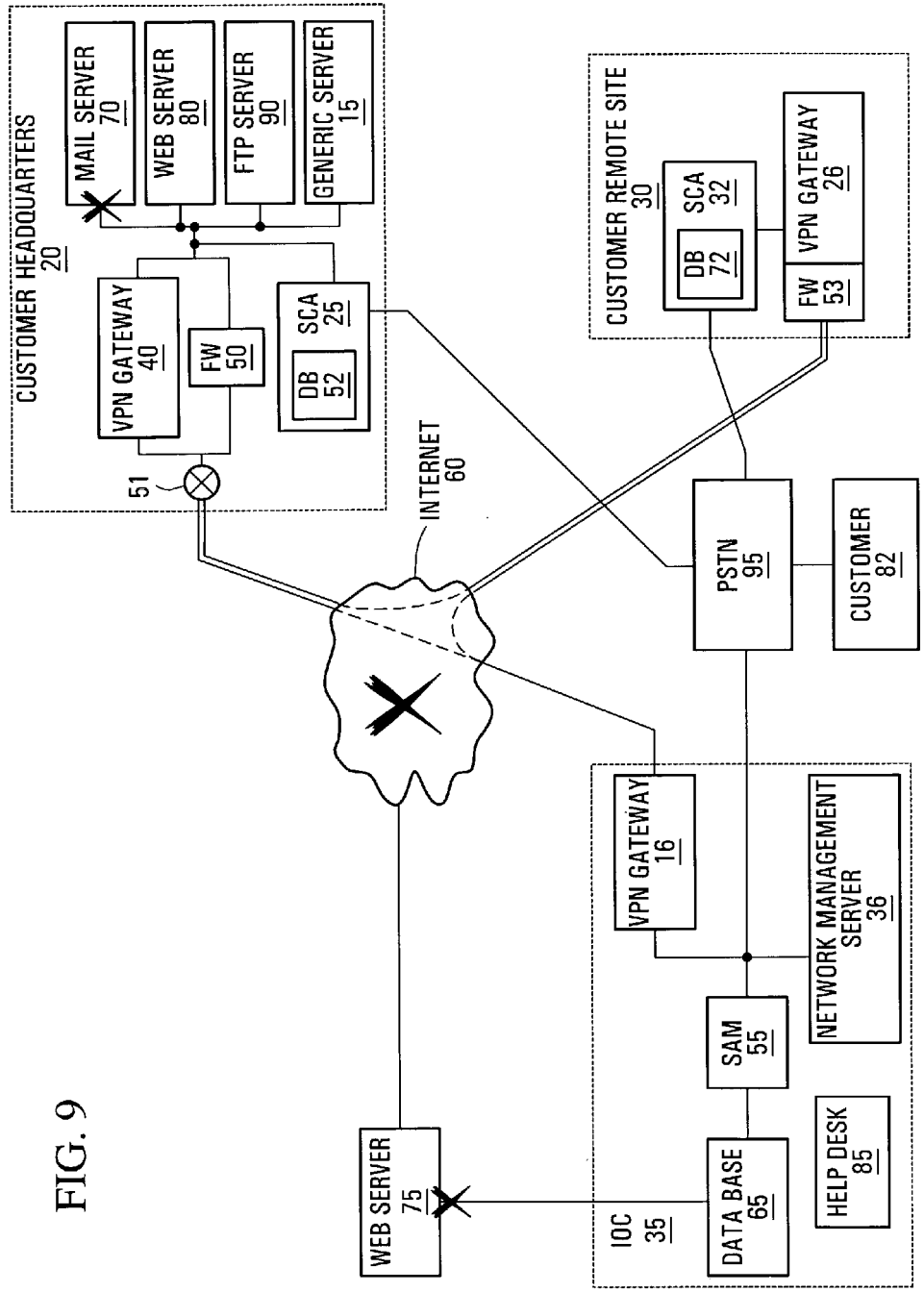
FIG. 9 is a system block diagram of an example deployment of the managed network service delivery system of FIG. 7 showing a hardware failure scenario.

Various failure scenarios will be described with reference to FIGS. 9 to 11. In FIG. 9 it is supposed that the mail server 70 at the customer headquarters has failed in some manner. This would manifest itself in logs or responses collected by the customer-side SCA 25 at the customer headquarters 20. At the same time, it is assumed that a connection between the web server 75 and the IOC 35 is also down or the public Internet 60 is congested, meaning that network management personnel are unable to detect the failure of the mail server 70 through the VPN. In such a circumstance, the customer-side SCAs 25, 32 at the customer headquarters 20 and the customer remote site 30, respectively, will still deliver the required information to the IOC 35 through the PSTN 95. At the same time the customer-side SCAs 25, 32 collect respective basic local information. The network management personnel can access required information directly from any one of the customer-side SCAs 25, 32 or can perform dial-up access to the IOC 35 to through the PSTN 95 and access the database 65.

Figure 10:
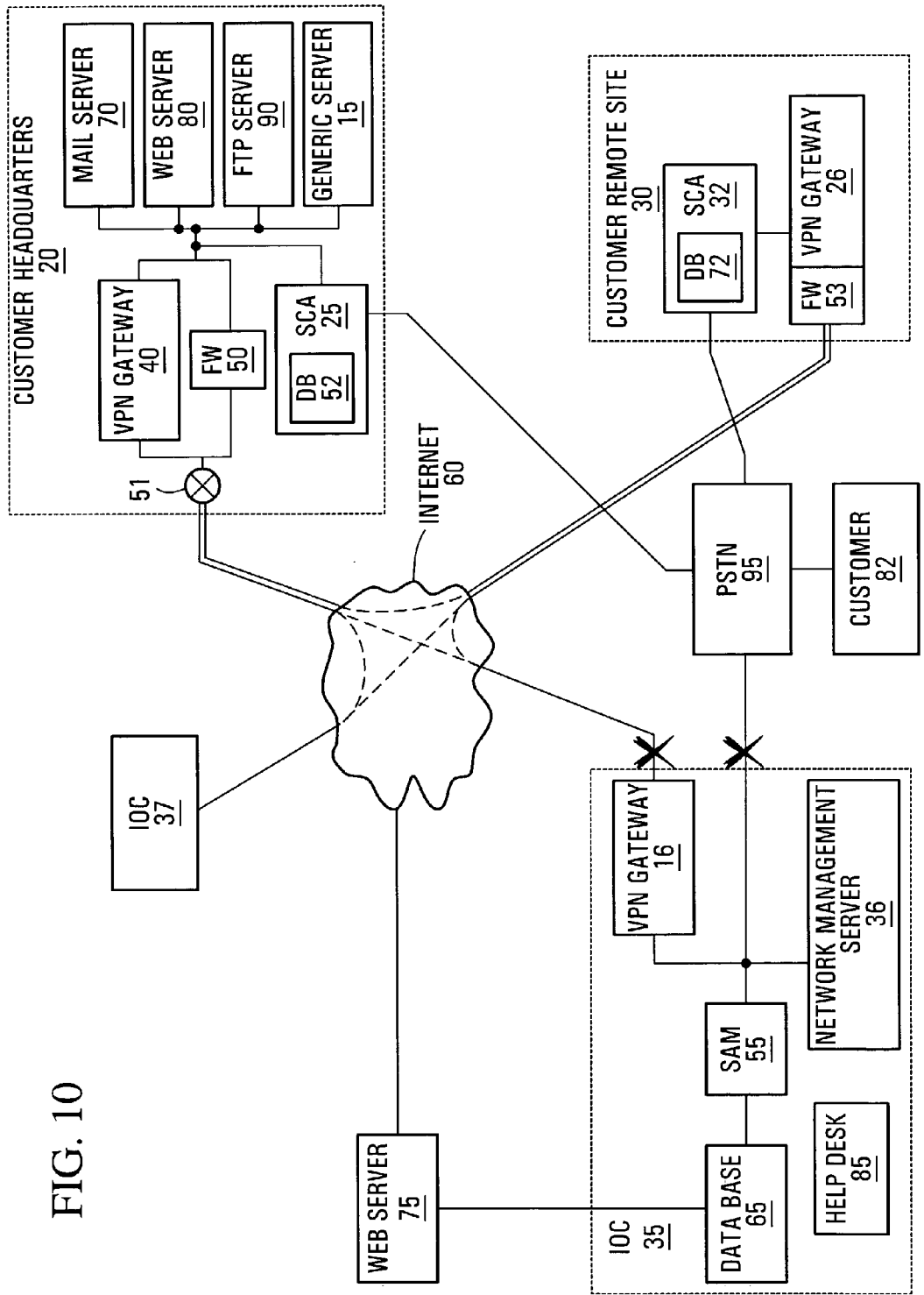
FIG. 10 is a system block diagram of an example deployment of the managed network service delivery system of FIG. 7 showing another hardware failure scenario.

Referring to FIG. 10, shown is a system block diagram of an example deployment of the managed network service delivery system of FIG. 7 showing another failure scenario. More particularly, the IOC 35 is not available either through the VPN gateway 16 or the PSTN 95, and in this case information is forwarded to a secondary IOC 37, through the public Internet 60, or the basic local information is distributed from one of the customer-side SCAs 25, 32 to another. Then, very simple device status information is made available to users authorized to access the customer-side SCAs 25, 32. Assuming that the IOC 35 is again unavailable for some reason, customer network management personnel can again obtain device status information from the basic local information at customer-side SCAs 25, 32. The device status information might be browser based or flat file basic information for example.

Figure 11:
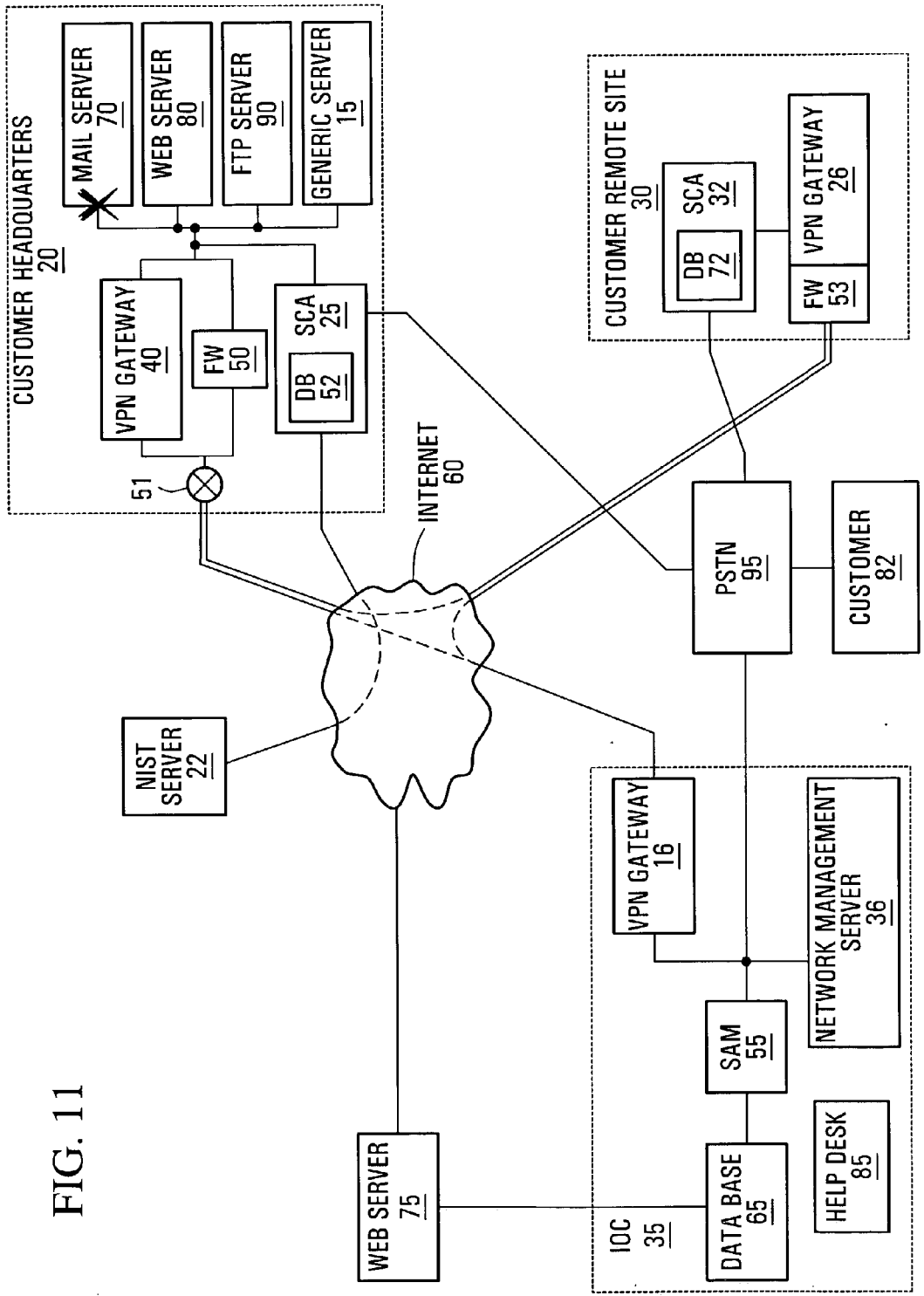
FIG. 11 is a system block diagram of an example deployment of the managed network service delivery system of FIG. 7 showing yet another hardware failure scenario.

Referring to FIG. 11, shown is a system block diagram of an example deployment of the managed network service delivery system of FIG. 7 showing yet another failure scenario. More particularly, shown is the NIST server 22 which allows the customer-side SCA 25 to have accurate representation of time. In this example, the customer-side SCA 25 periodically queries the NIST server 22 to obtain an accurate representation of time. Furthermore, in this example the mail server 70 fails and the failure is detected by the customer-side SCA 25. The customer-side SCA 25 has an accurate representation of time and determines the exact time that the mail server 70 failed. This time stamped event propagates through to the web server 75, and personnel can take appropriate action based on time stamps of the event.

In another embodiment of the invention, the LANs at the customer headquarters 20 and the customer remote site 30 are used to allow the IOC 35 to monitor real-time network latencies and response times between the customer headquarters 20 and the customer remote site 30 across the VPN. This is achieved by having the customer-side SCA 25 at the customer headquarters 20 send a ping through the VPN gateways 40, 26 and the public Internet 60 to the customer-side SCA 26, measuring the round trip delay, and sending this information to the IOC 35. In some embodiments, this is done frequently, for example every minute, to allow quick detection of a change in network latency. This is not possible in embodiments in which there is no SCA at the customer headquarters 20 and/or the customer remote site 30. Similarly, detection and real-time alerting of dropped site-to-site tunnels are detected in this manner.

In some embodiments of the invention, the customer-side SCAs 25, 32 are equipped with privacy monitoring applications that generate log files which are collected by a respective one of the customer-side SCAs 25, 32 for monitoring purposes. In other embodiments of the invention, customer headquarters 20 and the customer remote site 20 are equipped with an IDS (intrusion detection system) which is used to provide additional security services by monitoring illicit activity and generating log files which are collected by a respective one of the customer-side SCAs 25, 32 for monitoring purposes. In some embodiments, other elements of management and security applications are introduced at the IOC 35 and at the customer-side SCAs 25, 32. For example, in some embodiments, a SAM or a customer-side SCA carries an application, which performs data mining on information received. More particularly, data is collected from various customer sites into a meaningful interpretation of multiple events. Furthermore, in some embodiments of the invention, log messages are scanned for security messages by a customer-side SCA at a customer remote site or a customer headquarters and when security messages are detected alerts are generated.

In other embodiments, an application running on the firewall 50 allows the network management server 36 to perform remote management of the firewall 50. Such an application also allows testing of the firewall 50 both from the network management server 36 and the customer-side SCA 25. Furthermore, in some embodiments of the invention, applications run on the network management server 36 and on the customer-side SCAs 25, 32. In such embodiments, the customer-side SCAs 25, 32 have digitally signed operating systems and cryptographically signed operating systems as part of overall security features. The applications running on the customer-side SCAs 25, 32 are used to monitor the digitally signed operating systems and the cryptographically signed operating systems and send information to the IOC 35 for reporting. Finally, in some embodiments of the invention, the IOC 35 manages sites for several customers and the SAM 55 includes a trend analysis function. The SAM 55 receives information from the sites of each on of the customers and the trend analysis function performs a trend analysis on the received information to detect any trend related to managed security. For example, in some embodiments of the invention, the customer sites each have an intrusion detection system and a trend analysis is preformed on information received from customer-side SCAs at these customer sites. In an illustrative example, the analysis identifies intrusion at respective sites of several of the customers. This triggers alerts that are sent to the customers having intrusions indicating that there has been an intrusion attack. Alerts are also sent warning customers, whose sites have not experienced an intrusion, of possible intrusion. Alerts are not limited to cases where a trend is detected and in some cases a single event will trigger an alert.

Figure 12A:
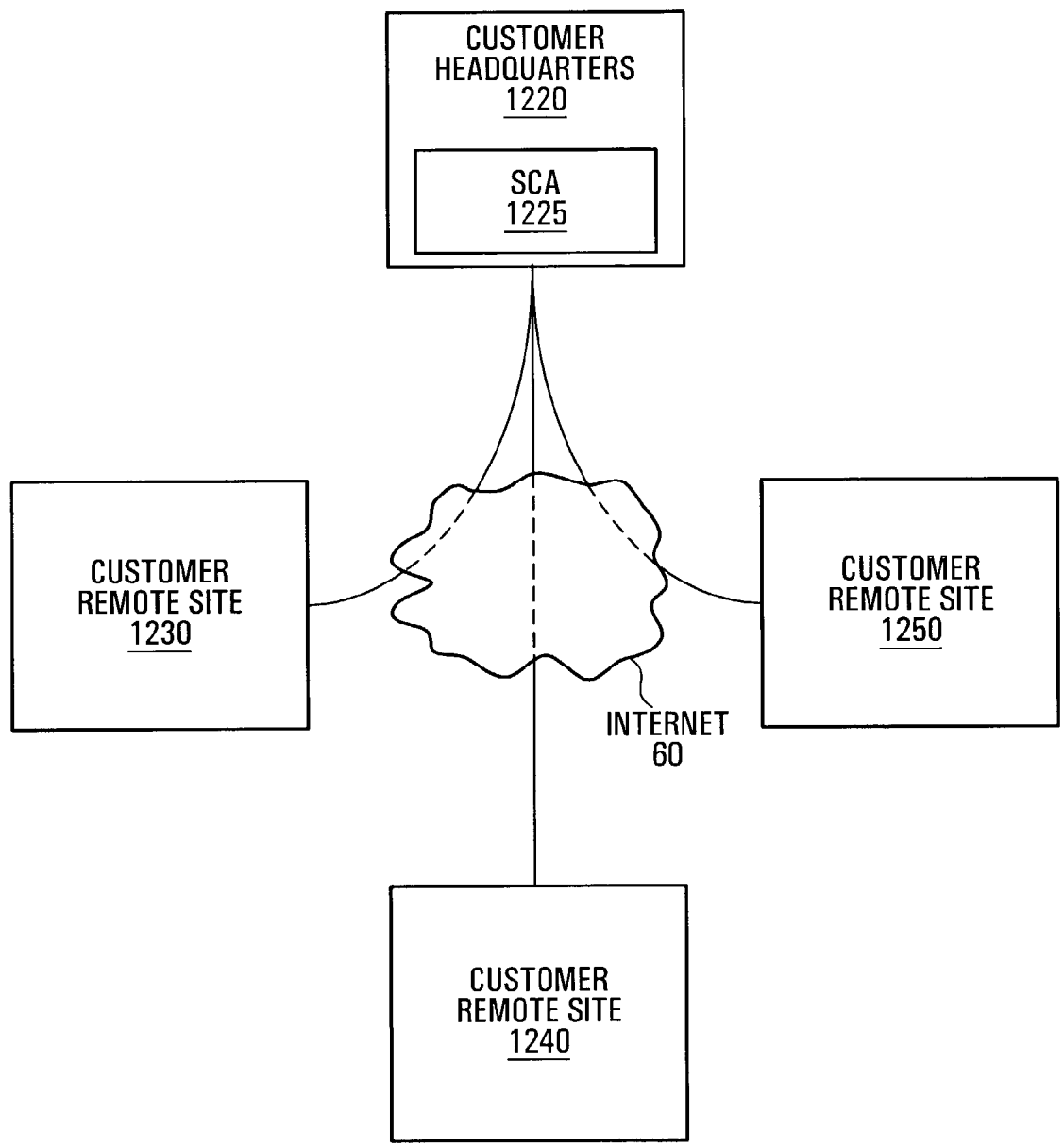
FIG. 12A is a system block diagram of an example deployment of a managed network service delivery system for management of a VPN (Virtual Private Network) that forms a star topology, provided by an embodiment of the invention.

As discussed above with reference to FIGS. 1 and 7, a VPN has connections between a customer's sites can be arranged in a star or mesh topology. A star topology is shown in FIG. 12A, where customer sites 1230, 1240 and 1250 are each connected to a customer headquarters 1220 through a VPN connection. The customer headquarters 1220 has a customer-side SCA 1225. In the embodiment of FIG. 12A, a connection between the customer headquarters 1220 and any one of the customer remote sites 1230, 1240, 1250 is monitored from the customer headquarters 1220. In other embodiments, one or more of the customer remote sites 1230, 1240, 1250 has an SCA. In such embodiments, for each one of the customer remote sites 1230, 1240, 1250 having an SCA, a respective connection to the customer headquarters 1220 can be monitored from a respective one of the customer remote sites 1230, 1240, 1250, resulting in monitoring at both ends of the respective connection.

Figure 12B:
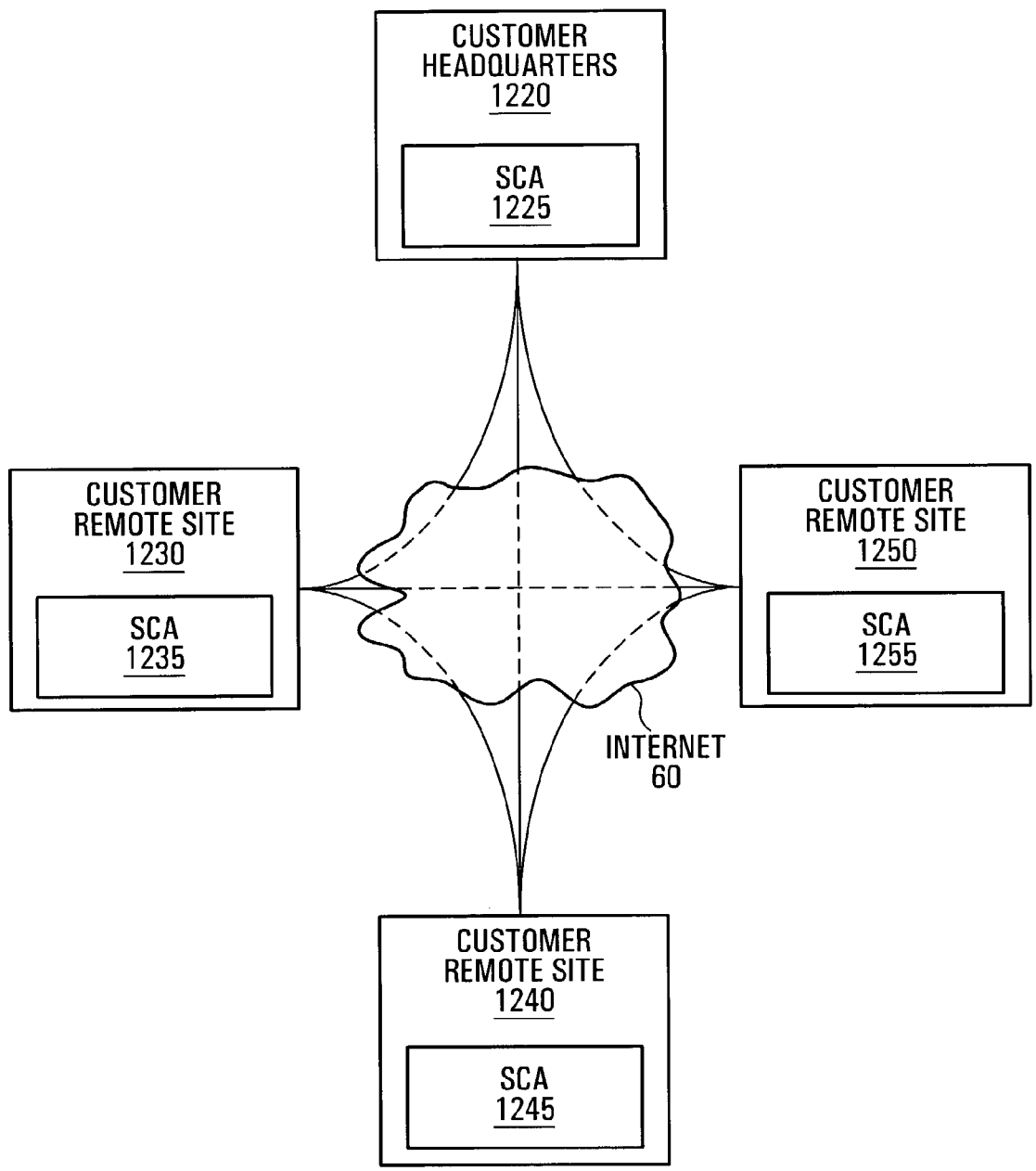
FIG. 12B is a system block diagram of an example deployment of a managed network service delivery system for management of a VPN that forms a mesh topology, provided by yet another embodiment of the invention.

In other embodiments of the invention, the VPN connections are arranged in a mesh topology where connections between customer remote sites exist. In FIG. 12B shown is a system block diagram of an example deployment of a managed network service delivery system for management of a VPN that forms a mesh topology, provided by yet another embodiment of the invention. The VPN connections of FIG. 12B are similar to the VPN connections of FIG. 12A except that the customer remote sites 1230, 1240, 1250 are also interconnected. Furthermore, the customer remote sites 1230, 1240, 1250, each have a respective one of SCAs 1235, 1245, 1255. The SCAs 1225, 1235, 1245, 1255 monitor respective connections resulting any one of the connections being monitored at both of its ends. In some embodiments, customer remote sites are only partially interconnected resulting in a partial mesh topology. Furthermore, in some embodiments, only a portion of customer remote sites have SCAs.

Numerous modifications and variations of the present invention are possible in light of the above teachings. It is therefore to be understood that within the scope of the appended claims, the invention may be practiced otherwise than as specifically described herein.

We claim:

1. A network management system for managing a VPN (Virtual Private Network) provided to a customer having a plurality of customer sites, each one of the customer sites having customer equipment, the network management system comprising:
    a network management center connectable to the customer sites through the VPN and adapted to manage the VPN; and
    a DCE (Data Collection Element) locatable at at least one of the customer sites and adapted to collect information on the customer equipment, the DCE being adapted to provide at least some of the information to the network management center on an ongoing basis through the VPN;
    wherein the DCE is adapted to access an alternative channel independent of the VPN through which to deliver the information to the network management center in the event that data cannot be delivered from the DCE to the network management center through the VPN.

2. A network management system according to claim 1 comprising an IDS (Intrusion Detection System) at one or more of the at least one of the customer sites, the IDS being adapted to provide security information on customer equipment to a respective DCE.

3. A network management system according to claim 1 comprising a DCE at each customer site.

4. A network management system according to claim 1 wherein said DCE is adapted to perform filtering of the information on the customer equipment and to then deliver filtered information to the network management center as summary information.

5. A network management system according to claim 1 wherein at least one of said DCE locatable at at least one of the customer sites comprises at least one security application adapted to monitor equipment at a respective one of the customer sites and provide status information, on the monitored equipment, to a respective DCE.

6. A network management system according to claim 1 wherein the network management center further comprises a remote access channel through which reports can be accessed by customers.

7. A network management system according to claim 1 wherein the network management center comprises a DPE (Data Processing Element) and a database in which data associated with reports on status information associated with the at least some of the information are stored by the DPE on an ongoing basis.

8. A network management system according to claim 7 wherein the network management center further comprises one or more web servers which retrieve the data from the database and makes the reports available to customers.

9. A network management system according to claim 7 wherein the DPE is adapted to receive the status information, to perform reporting of the status information and store said reports in the database and wherein the DPE is adapted to perform any necessary alerting actions based on the status information.

10. A network management system according to claim 7 wherein the DPE has a timer function which enables a timer to be set for a service associated with a customer equipment, the timer being reset each time a response of any type is received from the service and which if the timer reaches a timeout value without any response, generates an alert.

11. A network management system according to claim 7 wherein the DPE comprises a trend analysis function adapted to detect trends in the status information from DCEs of a plurality of customers and to provide security alerts based on the status information.

12. A network management system according to claim 1 wherein at least one of said DCE located at at least one of the customer sites is a restricted access server with limited access and is equipped with no extra external interfaces.

13. A network management system according to claim 1 wherein the alternative channel comprises a dial-up port through which the DCE can initiate a separate connection to the network management center through a PSTN (Public Switched Telephone Network).

14. A network management system according to claim 1 wherein the DCE is adapted to activate the alternative channel in the event that data cannot be delivered from the DCE to the network management center through the VPN.

15. A network management system according to claim 1 wherein the DCE further comprises NTP (Network Time Protocol) functionality employed in conjunction with a NIST (National Institute of Standards and Technology) server to have an accurate consistent understanding of time and to provide time stamped status information to the network management center.

16. A network management system according to claim 1 wherein the DCE further comprises a local database that is dynamically updated with basic local information.

17. A network management system according to claim 16 wherein the basic local information in the local database is made available through a stripped down browser based interface that is capable of returning only a limited amount of information.

18. A network management system according to claim 16 wherein the basic local information is distributed to the local databases of each of the customer's other DCEs such that there is a distributed representation of at least the basic local information about the network.

19. A network management system according to claim 16 wherein the DCE being equipped with the local database is adapted to have the capability to deploy certificates for authorized people to access the basic local information.

20. A network management system according to claim 19 wherein access through these certificates is granted in a prioritized manner which can be re-prioritized.

21. A network management system according to claim 16 wherein the local database is updated with the basic local information only upon detection that the network management center or a link to the network management center is not functioning.

22. A network management system according to claim 1 wherein in the event that data cannot be delivered from the DCE to the network management center through either of the VPN and the alternative channel, the DCE will keep data until a connection is established with the network management center at which time the data is sent to the network management center.

23. A network management system according to claim 1 wherein the DCE is further adapted to monitor at least one of real-time network latencies and connectivities between customer sites across the VPN.

24. A network management system according to claim 1 wherein the network management center comprises a network management server adapted to establish connections between the plurality of customer sites and the network management center and adapted to monitor the connections.

25. A network management system according to claim 24 wherein the network management server is further adapted to establish the alternative channel in the event that data cannot be delivered from the DCE to the network management center through the VPN.

26. A network management system according to claim 1 wherein the network management center comprises a network management server adapted to manage a plurality of network security devices at at least one of the customer sites.

27. A network management system according to claim 1 wherein the network management center comprises a DCE adapted to collect status information from equipment at customer sites of the plurality of customer sites which do not have DCEs, the DCE at the network management center being adapted to provide at least some of the status information from the equipment at the customer sites of the plurality of customer sites which do not have DCEs to the network management center on an ongoing basis.

28. A network management system according to claim 1 wherein the VPN is defined by a star topology.

29. A network management system according to claim 1 wherein the VPN is defined by a mesh topology.

30. A method of providing remote network management, the method comprising:
    establishing a connection between a network management center and a plurality of customer sites of a customer through a VPN;
    collecting information on equipment at at least one of the plurality of customer sites and providing at least some of the information to the network management center on an ongoing basis through the VPN; and
    establishing an alternative channel through which to deliver the information to the network management center in the event that data cannot be delivered from a respective one of the at least one of the plurality of customer sites to the network management center through the VPN.

31. A method according to claim 30 comprising:
    processing the information received at the network management center to produce reports; and
    making the reports available to the customer at the network management center through at least one of a public Internet and a PSTN.

32. A method according to claim 30 comprising managing equipment at the plurality of customer sites from the network management center.

33. A method according to claim 30 comprising:
    storing basic local information associated with the information generated by equipment at a respective one of the at least one of the plurality of customer sites in the event that the at least some of the information cannot be delivered to the network management center; and
    delivering the basic local information once a connection to the network management center is re-established.

34. A method according to claim 30 comprising:
    storing basic local information associated with the information generated by equipment at a respective one of the at least one of the plurality of customer sites; and
    making the basic local information available to the customer.

35. A method according to claim 30 comprising:
    storing basic local information associated with the information on equipment at a respective one of the at least one of the plurality of customer sites; and
    distributing the basic local information between the plurality of customer sites.

36. A method according to claim 30 comprising:
    monitoring, from the network management center, the connections between a network management center and the plurality of customer sites; and
    establishing an alternative channel, in the event that one of the connections is unavailable, to provide access to equipment at a respective one of the plurality of customer sites.

37. A process for delivering reliable and robust managed security services implementing the method of claim 30.

38. An apparatus for reliable data collection of information on equipment at a customer site within a VPN, the apparatus comprising:
    a DCE adapted to receive the information, to filter some of the information, to output the filtered information through a VPN connection of the VPN and in the event that the VPN connection is unavailable, output the filtered information through an alternative connection; and a local database within the DCE, the local database adapted to store the filtered information as basic local information.

39. An apparatus according to claim 38 wherein the DCE is adapted to retrieve the basic local information stored in the local database.

40. An apparatus according to claim 38 wherein the DCE is further adapted to establish the alternative connection in the event that the VPN connection is unavailable.

41. An apparatus according to claim 38 wherein the DCE is further adapted to further filter the filtered information to provide summary information.

42. An apparatus according to claim 40 wherein the DCE is further adapted to store the summary information as basic local information in the local database in the event that the summary information cannot be output through any one of the VPN connection and the alternative connection.

43. An apparatus according to claim 41 wherein the DCE is adapted to distribute the basic local information to other DCEs and receive other basic local information from the other DCEs.

44. An apparatus according to claim 38 wherein the DCE comprises at least one security application adapted to query network devices and report to a network management center, through any one of the VPN connection and the alternative connection, based on responses to queries.

45. A network management center for managing a VPN, the network management center comprising:
   a database;
   a DPE adapted to receive status information, process the status information to produce reports, and store data associated with the reports in the database; and
   a network management server adapted to establish connections, through the VPN, to a plurality of customer sites, to monitor the connections and to establish an alternative connection each time one of the connections through the VPN is unavailable.

46. A network management center according to claim 45 wherein the data associated with the reports in the database are made accessible to a web server for reports.

47. A network management center according to claim 45 wherein the network management server is further adapted to manage and configure remote network devices at the customer sites.

* * * * *